US007539500B2

(12) United States Patent
Chiang

(10) Patent No.: US 7,539,500 B2
(45) Date of Patent: May 26, 2009

(54) USING CELL PHONES AND WIRELESS CELLULAR SYSTEMS WITH LOCATION CAPABILITY FOR TOLL PAYING AND COLLECTION

(75) Inventor: Tung Ching Chiang, Berkeley Heights, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 201 days.

(21) Appl. No.: 11/129,301

(22) Filed: May 16, 2005

(65) Prior Publication Data

US 2006/0258367 A1 Nov. 16, 2006

(51) Int. Cl.
*H04W 24/00* (2006.01)

(52) U.S. Cl. ................................ 455/456.1; 455/456.5

(58) Field of Classification Search ............. 455/456.1, 455/456.5
See application file for complete search history.

(56) References Cited

U.S. PATENT DOCUMENTS 5,857,152 A * 1/1999 Everett ....................... 455/406
6,313,787 B1 * 11/2001 King et al. ............. 342/357.03
6,366,220 B1 4/2002 Elliott
6,705,521 B1 * 3/2004 Wu et al. .................... 235/384
6,744,383 B1 6/2004 Alfred et al.
2001/0054098 A1 12/2001 Lee
2003/0187787 A1 10/2003 Freund
2004/0181495 A1 * 9/2004 Grush ........................ 705/417
2004/0235492 A1 11/2004 Chang et al.
2004/0259522 A1 12/2004 Alicherry et al.

OTHER PUBLICATIONS

Lamance et al., Mar. 1, 2002, GPS World, “Assisted GPS: A Low-Infrastructure Approach”, p. 1.*

* cited by examiner

*Primary Examiner*—Lester Kincaid
*Assistant Examiner*—Steven Lim

(57) ABSTRACT

A method for toll collection via a wireless network may include tracking a current position of a mobile station within a vehicle, and collecting a toll based on the current position of the mobile station.

18 Claims, 4 Drawing Sheets

USING CELL PHONES AND WIRELESS CELLULAR SYSTEMS WITH LOCATION CAPABILITY FOR TOLL PAYING AND COLLECTION

BACKGROUND OF THE INVENTION

Conventionally, tollbooths are used to collect tolls on certain roadways, for example, highways, freeways, etc., also known as "toll-roads". When using tollbooths, cars are required to stop to make a payment, which subsequently slows down traffic and often leads to traffic jams, for example, on more heavily traveled roadways.

Recently, automated toll collecting systems, which use radio frequency (RF) tags have been introduced. In automated toll collecting systems, the RF tags may be used in transactions involving motor vehicles. When an RF tag is employed for toll collection, a vehicle may pass through a toll lane with out coming to a complete stop to make a payment.

An RF tag is a passive device that is preprogrammed with specific information. For vehicle applications, the RF tag is typically programmed with an account number for an authorized traveler, user, etc. The account number in turn may be associated with the traveler's address, phone number, vehicle model, license plate number, credit card account, etc.

Affiliating the RF tag with a customer's credit card account provides a billing authority or toll collection agency a way of billing the traveler for accrued toll charges. In addition, using the credit card account ensures that the billing authority is immediately paid each time the traveler incurs a toll charge using the RF tag.

These systems require the use of tollbooths for charging pre-paid debit cards and require users to purchase RFID devices in order to utilize the automated toll collecting systems. As such, these automated toll collection systems may incur substantial implementation and/or utilization costs (e.g., tollbooth installation and/or purchase of RFID devices, respectively).

SUMMARY OF THE INVENTION

Example embodiments of the present invention provide an automated toll collection system and method, which provide a cost effective and/or efficient way to implement automatic toll paying and/or collection systems.

For example, example embodiments of the present invention may use cellular phones and wireless cellular systems, which have location capability, for toll paying and/or toll collection.

A method for toll collection via a wireless network, according to an example embodiment of the present invention, may include tracking a current position of a mobile station within a vehicle, and collecting a toll based on the current position of the mobile station.

In example embodiments of the present invention, the collecting may include determining whether to make a toll collection based on the current position of the mobile station, and collecting a toll based on the determining step. In example embodiments of the present invention, the current position of the mobile station may be compared with stored locations of toll collection zones, and a toll may be collected if the comparing step indicates that the mobile station has traveled through a toll collection zone.

In example embodiments of the present invention, the tracking step may be initiated based on a message sent by the mobile station and/or the location of the mobile station respective to a base station. In example embodiments of the present invention, the current location of the mobile station may be updated periodically. The message may be one of a phone call or a text message. In example embodiments of the present invention, the initiating step may be performed at the mobile station and/or the base station.

In example embodiments of the present invention, the vehicle may be associated with the mobile station such that, when other mobile stations are present in the vehicle, only the associated mobile station may be tracked by the tracking step. The vehicle may be associated with the mobile station by associating a vehicle identification number for the vehicle with a mobile identification for the mobile station.

In example embodiments of the present invention, the mobile identification may be at least one of the mobile phone number associated with the mobile station and an electronic serial number associated with the mobile station. In example embodiments of the present invention, the mobile station may be associated with the vehicle using at least one of a mobile identification for the mobile station and a vehicle identification number for the vehicle.

In example embodiments of the present invention, the location of the mobile phone may be tracked using a global positioning system, and/or the location of the mobile station may be tracked using a network, which may support an emergency location service.

In example embodiments of the present invention, the mobile station may be tracked using at least one of a network-based, a handset-based, and a hybrid approach.

In example embodiments of the present invention, the mobile station may be tracked using an assisted global positioning system technique.

Example embodiments of the present invention may be used with currently existing automated toll collection systems, infrastructure, and/or eliminate the use of toll booths.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

DETAILED DESCRIPTION OF THE EMBODIMENTS

Figure 1:
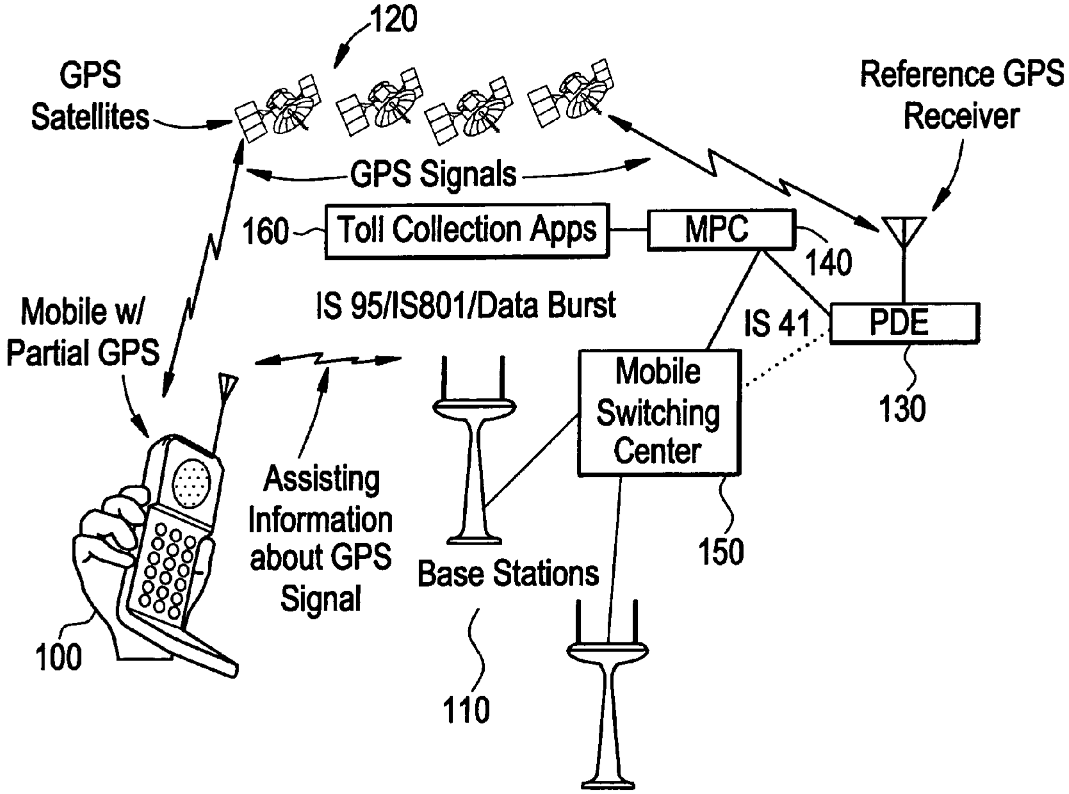
FIG. 1 illustrates a toll collection system, according to an example embodiment of the present invention, which may at least partially utilize an existing wireless communications network.

FIG. 1 illustrates a toll collection system according to an example embodiment of the present invention. As illustrated in FIG. 1, a mobile station (MS) 100 may be a cellular phone or mobile unit, which may be representative of vehicle-born mobile units. Vehicle-born mobile units may be hard-wired into vehicles or carried by a driver or passenger, etc. The MS 100 may include at least a partial GPS receiver and may be capable of performing network-based (e.g., Time Difference of Arrival), handset-based (e.g., Advanced Forward Link Trilateration), and hybrid (e.g., Assisted GPS (A-GPS)) approaches for mobile station location. These approaches may be similar to those used in emergency location services, for example, E911. Although only one MS 100 is shown in FIG. 1, it will be understood that there may be any number of mobile stations in the wireless communications network illustrated in FIG. 1.

In example embodiments of the present invention, the MS 100 may be in communication with position determining equipment (PDE) 130 via one or more base stations (BS) 110 and a mobile switching center (MSC) 150. Hereinafter, the MSC 150 and the BS 110 will be collectively referred to as a core network.

The PDE 130 may include a reference global positioning system (GPS) receiver, and may be capable of transmitting and receiving GPS signals to and from GPS satellites 120. In operation, the PDE 130 may track a current position of the MS 100. A method for tracking a current position of the MS 100, according to an example embodiment of the present invention, will be described in detail with regard to FIG. 2.

As stated above, the MS 100 may be a vehicle-born mobile unit, which may include at least a partial GPS receiver and may be capable of performing an assisted-GPS locating technique.

Returning to FIG. 1, the PDE 130 may also be in radio communication with a mobile positioning center (MPC) 140. The MPC 140 may be a server computer, which manages position information received from the PDE 130 for one or more mobile stations within a wireless network. For example, with regard to FIG. 1, the MPC 140 may store a current latitude and longitude of the MS 100, which may be determined by the PDE 130.

The MPC 140 may be in communication with a toll collection application (TCA) 160. The TCA 160 may be similar to conventional automated toll collection systems and may utilize existing conventional automated toll collection systems infrastructure. In example embodiments of the present invention, the TCA 160 may be a processing system run on a computer, which may include at least a database and software instructions for processing toll transactions (e.g., toll payments and/or collections). The database may include, for example, traveler information, transaction information, and toll collection information. Traveler information may include, for example, personal traveler information (e.g., name, address, etc.) for the owner of a particular mobile station, an electronic serial number (ESN) of a particular vehicle-born mobile station, a vehicle identification number (VIN) associated with the mobile station, and a current position of the associated mobile station (e.g., provided by the MPC 140). The transaction information may include information for charging (or collecting) a toll to a traveler's account. The traveler's account may be previously created in any conventional manner, which is well known in the art. Toll collection information may include locations of base stations to be used in toll collection, and positions of toll collection zones within each coverage area of each base station stored at the TCA 160. For example, the TCA 160 may include location information for each base station with a coverage area including a toll-road. Toll collection information may also include payment amount information for each toll collection zone within each coverage area (or cell).

A method for establishing a current position of a mobile station, according to an example embodiment of the present invention, will now be described with regard to FIG. 2. Although any suitable locating technique may be used, example embodiments of the present invention will be described with regard to an assisted-GPS system. Further, this example embodiment will be described with reference to FIG. 1, however, it will be understood that example embodiments of the present invention may be implemented in any suitable network.

Figure 2:
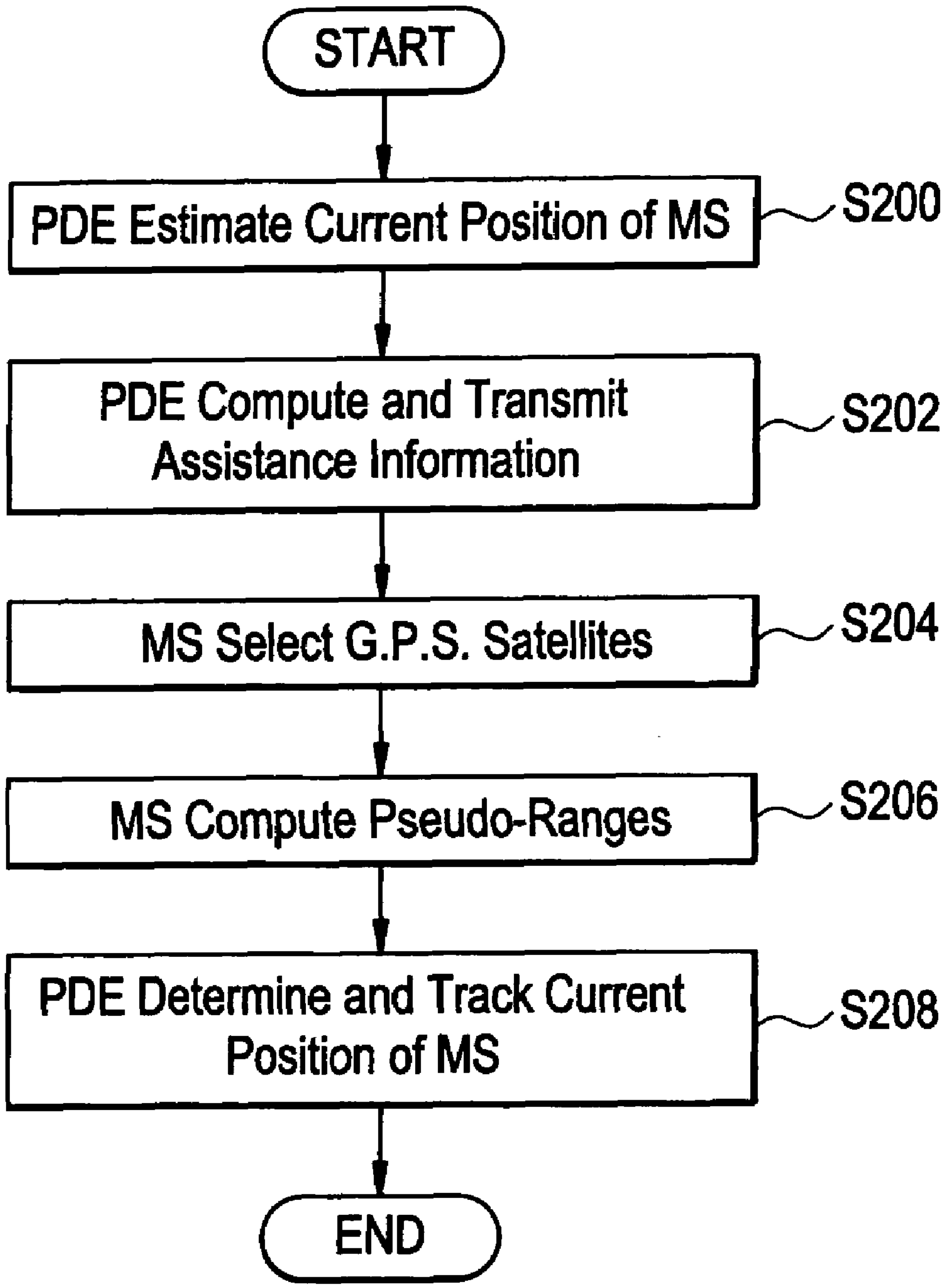
FIG. 2 illustrates a method for toll collection, according to an example embodiment of the present invention.

As illustrated in FIG. 2, at S200, the PDE 130 may estimate a current position of the MS 100. For example, initially the PDE 130 may solicit a cell and/or sector position of the mobile station 100 from the MSC 150. That is, the MSC 150 may indicate to the PDE 130 the position of the MS 100 within a base station's coverage area (or cell). Concurrently, the PDE 130 may monitor GPS signals from GPS satellites 120. Utilizing both the GPS signals from GPS satellites 120 and the cell or sector position obtained from the MSC 150, the PDE 130 may estimate a current position of the MS 100.

Returning to FIG. 2, at step S202, using the estimated current position of the MS 100, the PDE 130 may compute GPS assistance information for assisting the MS 100 in acquiring GPS signals from the GPS satellites 120. That is, for example, the GPS assistance information may include predicted GPS signals, which may be received by the MS 100 at any given time.

For example, the PDE 130 may predict one or more pseudo range phase sequences, which the MS 100 may use to despread GPS signals received from one or more of the GPS satellites 120, within ±5 chips. The PDE 130 may then transmit the computed GPS assistance information to the MS 100 via the core network.

Returning to FIG. 2, the MS 100 may receive the GPS assistance information transmitted from the PDE 130 and use the received GPS assistance information to select one or more GPS satellites 120 to use in tracking its current location, at step S204. For example, the MS 100 may utilize one or more predicted pseudo range sequences to narrow the search window for locating the actual pseudo range phases of GPS signals from one or more GPS satellites 120. This may enable the MS 100 to more efficiently acquire the actual pseudo range phases of GPS signals received from one or more GPS satellites 120.

Returning again to FIG. 2, after determining actual pseudo range phase(s) of GPS signals from one or more GPS satellites 120, the MS 100 may compute one or more selected satellite indicators. Namely, for example, the MS 100 may compute pseudo range phases for GPS signals received from one or more selected GPS satellites 120, at S206.

At S208, the MS 100 may send the selected satellite indicators to the PDE 130, and the PDE 130 may track a current position of the MS 100 using the selected GPS satellites 120. Namely, for example, the MS 100 may transmit the computed pseudo range phases to the PDE 130 via the core network and the PDE 130 may track the current location of the MS 100 using the one or more GPS satellites 120 selected by the MS 100.

Figure 3:
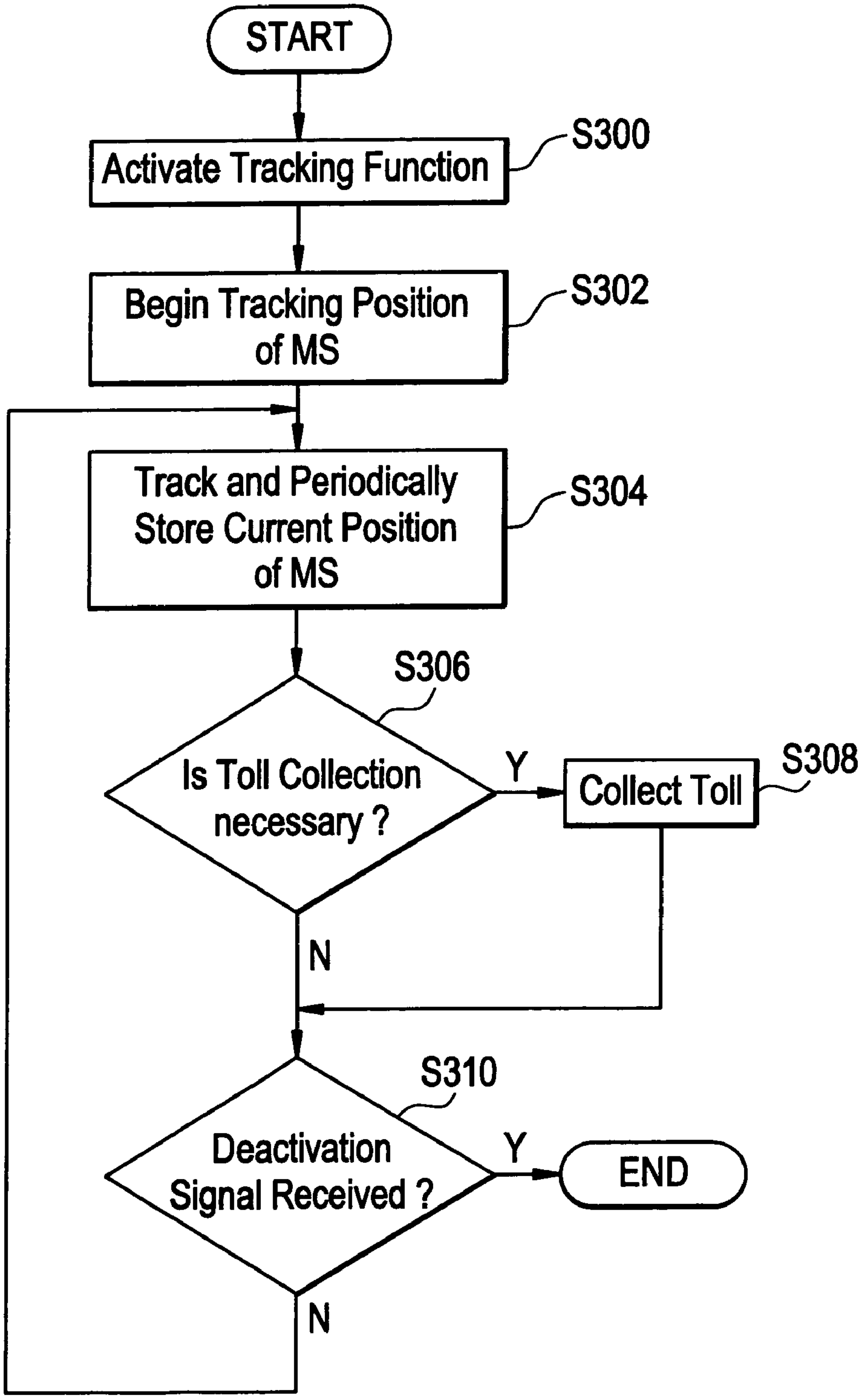
FIG. 3 illustrates a method for tracking a current position of a mobile station, according to an example embodiment of the present invention.

FIG. 3 illustrates a method for toll collection, according to an example embodiment of the present invention. This example embodiment will also be described with reference to FIG. 1, however, it will be understood that example embodiments of the present invention may be implemented in any suitable network.

As illustrated in FIG. 3, at S300, the TCA 160 may receive a tracking function initiation command from at least one of the core network (e.g., the base stations 110 or the MSC 150) and the MS 100, and the TCA 160 may activate its tracking function. For example, the MS 100 may place a call or send a message (e.g., voice, data, text message, etc.) to the TCA 160 to activate a tracking function in the TCA 160.

After receiving the initiation message from, for example, the MS 100, the TCA 160 may transmit an initiation command to the PDE 130, via the MPC 140, to begin tracking the current position of the MS 100, at S302. As described above, the MPC 140 may serve as an interface between the TCA 160 and the PDE 130, for example, by storing position information for the MS 100, determined by the PDE 130.

In response to the initiation command from the TCA 160, the PDE 130 may track the current position of the MS 100, for example, using the method as described above with regard to FIG. 2, and periodically store the current position of the MS 100 at a database in the MPC 140, at S304. For example, the PDE 130 may continuously track the current position of the MS 100, and may periodically update the current position of the MS 100 stored in the database at the MPS 140, every five minutes, ten minutes, thirty minutes, etc.

At step S306, each time the current position is updated, the TCA 160 may determine whether toll collection is necessary, at step S306. Namely, for example, the TCA 160 may compare the current position of the MS 100 stored in the MPC 140, with toll collection zone position information, in order to determine whether the MS 100 is passing through, or has passed through a particular toll collection zone. A method for determining whether a mobile station is passing through or has passed through a toll collection zone will be described in more detail below with regard to FIG. 4.

Returning to FIG. 3, if the TCA 160 determines that the MS 100 is traveling through, or has traveled through a toll collection zone, the TCA 160 may collect an appropriate toll at step S308. For example, the TCA 160 may determine the appropriate toll (or fee) and apply the charge to the traveler's account based on the transaction information associated with the MS 100. Similar to conventional automated toll collection systems, the traveler's account may be linked to, for example, credit or debit-card, and the determined toll charge may be charged to a traveler's credit card account or deducted from a traveler's bank account, respectively. In example embodiments of the present invention, the toll charges may be a flat or variable toll charge.

Referring again to FIG. 3, at S310, the TCA 160 may determine if a deactivation signal has been received. If a deactivation signal has not been received, the tracking function may still be active, and the method may return to step S304 and repeat.

Returning to step S310, if a deactivation signal has been received, the tracking function is deactivated, and the procedure may terminate. In example embodiments of the present invention, the deactivation signal may be, for example, a second call (e.g., voice, data, text, etc.) to the TCA 160.

Returning to step S306, if the TCA determines the toll collection is unnecessary (e.g., the MS 100 is not currently and/or has not previously passed through one or more toll collection zones), the process may proceed to step S310, and the TCA 160 may determine if a deactivation signal has been received. The process may then proceed as described above.

Figure 4:
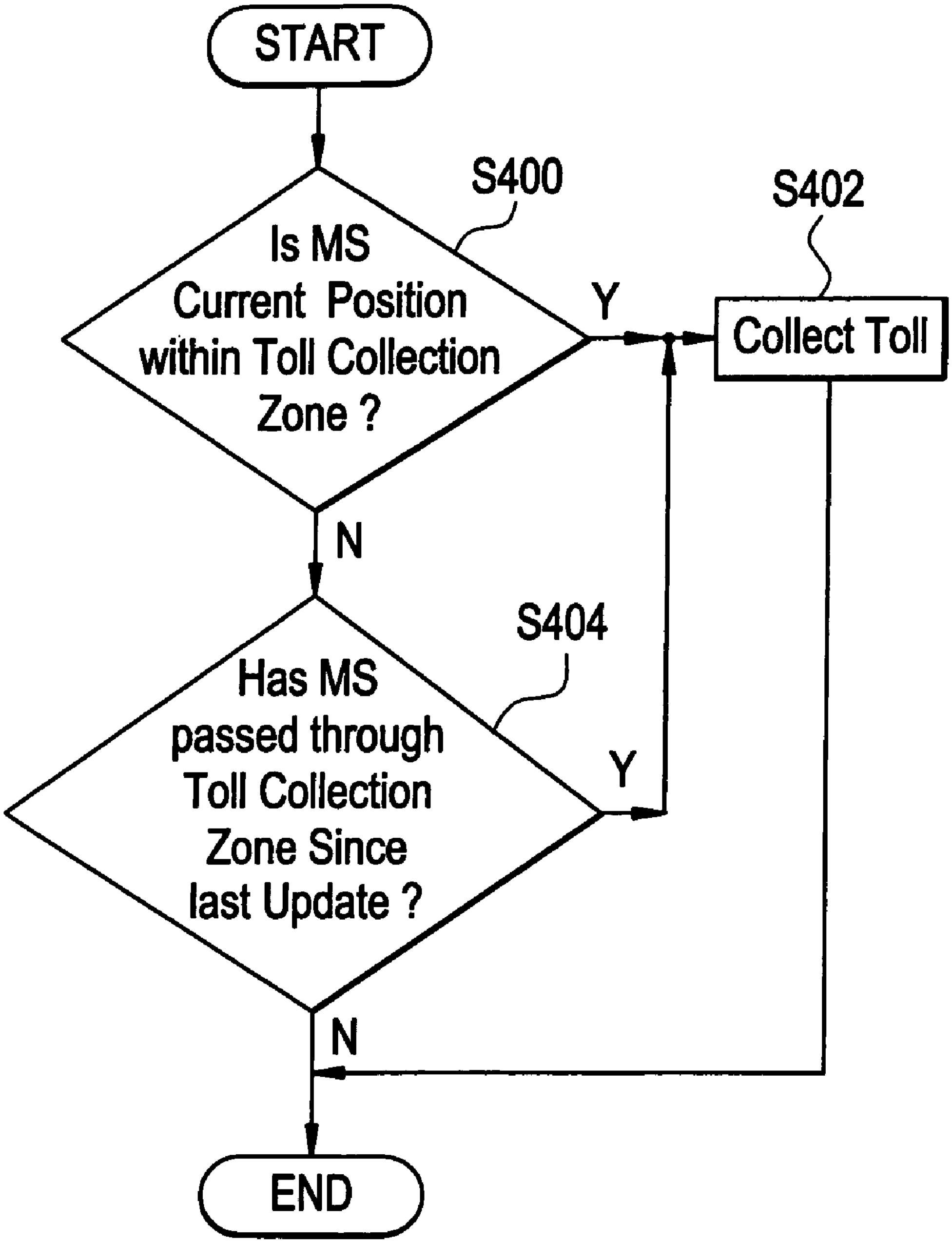
FIG. 4 illustrates a method for determining whether to collect a toll, according to another example embodiment of the present invention.

FIG. 4 illustrates a method for determining whether to collect a toll, according to an example embodiment of the present invention. As illustrated in FIG. 4, at step S400, the TCA 160 may determine whether the MS 100 is currently passing through a toll collection zone. For example, the TCA 160 may compare the current position of the MS 100 to a position of each toll collection zone within the cell, which the MS 100 is currently located. As discussed above, the position of the MS 100 may be stored at the MPC 140, while the position of the toll collection zones may be stored at the TCA 160.

If the MS 100 is currently passing through (e.g., currently located in) a toll collection zone, a toll collection may be made at step S402 unless a toll has already been previously collected upon entry into the toll collection zone. In this case, another toll may not be collected for a respective toll collection zone until the MS 100 has exited and re-entered the toll collection zone.

Returning to step S400, if the MS 100 is not currently passing through a toll collection zone, the TCA 160 may determine whether the MS 100 has previously passed through a toll collection zone at step S404. For example, the TCA 160 may examine the path of the MS 100 between the previous position of the MS 100 (e.g., the position of the MS 100 immediately preceding the current location) and the current position of the MS 100 to determine if a toll collection zone exists. If a toll collection zone does exist in the path between the previous position of the MS 100 and the current position of the MS 100, a toll collection may be made, as described above, at step S402. Returning to step S404, if a toll collection zone does not exist between the previous position and the current position of the MS 100, the procedure may terminate.

In the example embodiment of the present invention, as illustrated in FIG. 4, if no previous position of the MS 100 exists (e.g., if one position of the MS 100 is stored at the MPC 140), the TCA 160 may perform steps S400 and S402 (if necessary), and may omit step S404.

In example embodiments of the present invention, while the tracking function is active, the PDE 130 may send updated position information for the mobile station 100 to the MPC 140. The PDE 130 may send updated position information to the MPC 140 periodically in preset time intervals, which may be, for example, one minute, five minutes, ten minutes, etc.

In another example embodiment of the present invention, the TCA 160 may automatically activate its tracking function upon activation of the MS 100 (e.g., when the MS 100 is turned on). For example, upon activation of the MS 100, the MS 100 may automatically send an initiation message to the TCA 160.

In this example embodiment, toll collection may be performed in a manner smiliar to that as described above, however, a technique for distinguishing a toll paying mobile station from other mobile stations, which may be present in the same vehicle may be needed. Accordingly, upon initiation of the tracking function, for example, by the MS 100, a Vehicle Identification Number (VIN) along with a mobile ID (e.g., ESN) may be transmitted by the MS 100 to TCA 160 for authentication. The VIN may be programmed into the MS 100, or the carrying vehicle may transmit the VIN to the MS 100 via, for example, any conventional wireless communication protocol.

In example embodiments, a mobile station 100 may have a button dedicated to the activation and deactivation of the tracking function at the TCA 160. For example, it has been contemplated that all, or substantially all, vehicles be equipped with a telematics control unit (TCU). Accordingly, it will be understood that example embodiments of the present invention may be implemented in the same, or substantially the same, manner, or be added as an additional function to already existing telematics control units (TCUs).

In example embodiments of the present invention, the core network may send an initiation message to the TCA 160 initiating the tracking function at the TCA 160. For example, a base station having a coverage area including at least one toll collection zone may send an initiation message to the TCA 160 when the base station receives signals from the respective mobile station. Similarly, the core network may send a deactivation message to the TCA 160 deactivating the tracking function at the TCA 160. For example, a base station having a coverage area including at least one toll collection zone may send a deactivation message to the TCA 160 when the base station no longer receives signals from the respective mobile station. That is, for example, when the mobile station leaves a respective base stations coverage area.

In this example embodiment, similar to that as discussed above, the toll paying mobile station needs to be distinguished from the mobile stations in the same vehicle in order to suppress redundant charges to multiple accounts. Accordingly, upon initiation of the tracking function, for example, by the MS 100, a Vehicle Identification Number (VIN) along with a mobile ID (e.g., ESN) may be transmitted by the MS 100 to TCA 160 for authentication. The VIN may be programmed into the MS 100, or the carrying vehicle may transmit the VIN to the MS 100 via, for example, any conventional wireless communication protocol.

Example embodiments of the present invention provide methods for using the location information about a vehicle born mobile station to determine whether the vehicle-born mobile station is passing, or has passed through a toll collection zone. The determination may be made available to the appropriate billing authority or agency (e.g., a toll collection application or agency) and, if appropriate, a toll or tolls may be collected.

Example embodiments of the present invention may be implemented using any existing toll collection infrastructure as a backbone. That is, for example, users may have accounts similar to the "EZ Pass" system, which may be linked to a credit or debit card, and tolls may be paid in a manner similar or substantially similar to conventional payment systems and/or methods. Alternatively, example embodiments of the present invention as described herein may alleviate the need for tollbooths, which may decrease traffic disturbances associated with existing toll booths, and/or reduce implementation and/or usage costs associated with automated toll collection systems.

Example embodiments of the present invention have been described with regard to assisted GPS mobile station location. However, it will be understood that the location of the MS 100 may be determined using any network-based approach including Time Difference of Arrival (TDOA), Angle of Arrival (AOA), or Multipath Analysis (MPA); any handset-based approach including Advanced Forward Link Trilateration (TFLA); and/or any hybrid approach including Assisted GPS or enhanced observed time difference (ETOD). Example embodiments of the present invention may utilize one or multiple of the above approaches and/or methods in determining a current location of the MS 100.

In example embodiments of the present invention, the TCA 160 was described as monitoring position information stored at the MPC 140. However, the TCA 160 and the MPC 140 may be co-located and transmission of the data stored at the MPC 140 may not be required. Alternatively, however, it will be understood that the MPC 140 may also transmit current position information for the MS 100 to the TCA 160.

The invention being thus described, it will be obvious that the same may be varied in many ways. Such variations are not to be regarded as a departure from the invention, and all such modifications are intended to be included within the scope of the invention.

I claim:

1. A method for toll collection via a wireless network, the method comprising:

estimating, by a position determining equipment, a current position of a mobile station within a vehicle based on position information for the mobile station acquired from the wireless network and a satellite-based positioning system;

initiating, by a toll collection application, tracking of the current position of the mobile station by the position determining equipment, the initiating step being performed in response to a message received from the mobile station;

tracking, by the position determining equipment, the current position of the mobile station, the mobile station being located within the vehicle; and collecting, by the toll collection application, a toll based on the current position of the mobile; wherein the position determining equipment is geographically separated from the mobile station.

2. The method of claim 1, wherein the collecting step further comprises:

determining whether to make a toll collection based on the current position of the mobile station; and collecting a toll based on the determining step.

3. The method of claim 2, wherein the determining step further comprises:

comparing the current position of the mobile station with stored locations of toll collection zones; and determining whether to make a toll collection if the comparing step indicates that the mobile station has traveled through a toll collection zone.

4. The method of claim 1, wherein the tracking step further comprises:

updating the current location of the mobile station periodically.

5. The method of claim 1, wherein the message is one of a phone call or a text message.

6. The method of claim 1, further comprising:

initiating the tracking step based on the location of the mobile station relative to a base station.

7. The method of claim 6, wherein the initiating step is performed at the base station.

8. The method of claim 6, wherein the initiating step is performed at the mobile station.

9. The method of claim 1, wherein the vehicle is associated with the mobile station such that, when other mobile stations are present in the vehicle, only the associated mobile station is tracked by the tracking step.

10. The method of claim 9, wherein the vehicle is associated with the mobile station by associating a vehicle identffication number for the vehicle with a mobile identffication for the mobile station.

11. The method of claim 9, wherein the mobile identification is at least one of the mobile phone number associated with the mobile station and an electronic serial number associated with the mobile station.

12. The method of claim 1, further comprising:

associating the mobile station with the vehicle using at least one of a mobile identification for the mobile station and a vehicle identification number for the vehicle.

13. The method of claim 1, wherein the tracking uses a global positioning system.

14. The method of claim 1, wherein the location of the mobile station is tracked using a network, which supports an emergency location service.

15. The method of claim 1, the mobile station is tracked using at least one of a network-based, a handset-based, and a hybrid approach.

16. The method of claim 1, wherein the mobile station is tracked using an assisted global positioning system technique.

17. The method of claim 1, further comprising:

generating and transmitting to the mobile station, location assistance information to assist the mobile station in selecting satellites in the satellite-bases system; and receiving an indication of the selected satellites from the mobile station; wherein the tracking step tracks the current location of the mobile station using the selected satellites.

18. The method of claim 17, wherein the location assistance information is a pseudo-range of GPS signals for a GPS satellite.

* * * * *